(12) United States Patent
Adler et al.

(10) Patent No.: US 9,853,916 B2
(45) Date of Patent: Dec. 26, 2017

(54) MODULAR FABRIC INTERNAL DATAPATH

(71) Applicant: INTEL CORPORATION, Santa Clara, CA (US)

(72) Inventors: Robert P. Adler, Santa Clara, CA (US); Cristian E. Savin, Santa Clara, CA (US); Vishnu Vardhan Nandakumar, Santa Clara, CA (US); Yashpreet Kaur, San Jose, CA (US); Soe Myint, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 15/088,330

(22) Filed: Apr. 1, 2016

(65) Prior Publication Data
US 2017/0289063 A1 Oct. 5, 2017

(51) Int. Cl.
*H04L 12/933* (2013.01)
*H04L 12/931* (2013.01)

(52) U.S. Cl.
CPC .......... *H04L 49/101* (2013.01); *H04L 49/102* (2013.01); *H04L 49/201* (2013.01)

(58) Field of Classification Search
CPC .... H04L 49/101; H04L 49/102; H04L 49/201
See application file for complete search history.

(56) References Cited

U.S. PATENT DOCUMENTS

| | | | |
|---|---|---|---|
| 6,356,548 B1 | 3/2002 | Nellenbach et al. | |
| 7,009,985 B2 * | 3/2006 | Black | H04L 12/4625 370/389 |
| 2006/0023708 A1 * | 2/2006 | Snively | H04L 45/00 370/389 |
| 2013/0145329 A1 | 6/2013 | Brandt et al. | |
| 2013/0152031 A1 | 6/2013 | Hakewill et al. | |
| 2013/0163605 A1 | 6/2013 | Chandra et al. | |
| 2015/0188848 A1 | 7/2015 | Tran et al. | |

OTHER PUBLICATIONS

International Search Report and Written Opinion for International Patent Application No. PCT/US17/19734, dated May 24, 2017.

* cited by examiner

*Primary Examiner* — Duc C Ho
(74) *Attorney, Agent, or Firm* — Green, Howard & Mughal LLP (57) ABSTRACT

Described is an apparatus comprising one or more router circuitries. One or more of the circuitries may be a shared-bus router circuitry including a plurality of shared-bus ports and a shared-bus datapath, and one or more of the circuitries may be a crossbar router circuitry including a plurality of crossbar ports and a crossbar datapath. Also described are methods of making the apparatus, which may include: providing one or more design files modeling the apparatus, the shared-bus datapath, and the crossbar datapath; incorporating a configuration parameter for the datapath into the one or more design files; and setting an RTL configuration parameter to instantiate either the shared-bus backbone or the crossbar backbone. The methods may also include loading the one or more design files with a design tool and compiling the one or more design files with the design tool.

20 Claims, 6 Drawing Sheets

MODULAR FABRIC INTERNAL DATAPATH

BACKGROUND

The microarchitecture of a router within an interconnect fabric may be the most significant factor impacting the fabric's bandwidth and latency characteristics. Some router designs may incorporate a bus shared among a plurality of ports. Each port may request access to the shared bus in order to place an inbound transaction on the bus and transmit it to another port. If multiple ports simultaneously request access to the shared bus, a centralized arbiter may arbitrate between the requesting ports and grant access to the shared bus one port at a time. Since all ports must arbitrate for access to the single shared bus, the router is limited to transferring only one "chunk" of data (e.g., one unit of data) in any particular clock cycle. For such a "shared-bus backbone," the bandwidth of the router may be limited to one "chunk" per clock cycle.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Some router designs may incorporate a crossbar between a plurality of ports, and dedicated paths for traffic may exist from each port to every other port. Each port may request access to one of the other ports in order to place an inbound transaction on the dedicated path between the two ports. If multiple ports simultaneously request access to the same port, an arbiter associated with that port may arbitrate between the requesting ports and grant access to them, one at a time. However, in contrast with a shared-bus design, a crossbar-style router may transfer up to one "chunk" of data through every port in any particular clock cycle. Thus, for such a "crossbar backbone" having N ports, the bandwidth of the router may be limited to N "chunks" per clock cycle.

The router microarchitecture may fundamentally affect other aspects of the interconnect fabric, and the microarchitecture of the router may accordingly become integral to the rest of the fabric's design. As a result, any fundamental changes to the datapath of a router—such as replacing the datapath with an entirely different sort of datapath—may be effectively impossible without requiring a complete redesign of the rest of the fabric.

Some fabrics may have a network of routers. Each router may, in turn, incorporate a datapath. Some routers may have microarchitectures incorporating shared-bus datapaths. Other routers may have microarchitectures incorporating crossbar datapaths. Since the maximum bandwidth of a crossbar datapath may be proportional to the number of ports coupled to the datapath, incorporating crossbar datapaths into a fabric's design may advantageously improve the ability of the router to scale into high-performance technology segments.

As discussed above, fundamentally changing the microarchitecture of a router may be effectively impossible without requiring a redesign of the rest of the fabric, which may be very labor intensive. Design teams may be small, however, and may need to support a wide variety of designs with the same design resources.

A router microarchitecture capable of supporting the use of either a shared-bus backbone or a crossbar backbone may thus advantageously improve the capacity of a small design team to support a wide variety of network designs. In the router architectures discussed below, the style of datapath may be selected at a high level within a design flow, such as by setting a single configuration parameter. In fabric microarchitectures incorporating more than one router, the style of datapath may be selected on a per-instance basis. For example, datapaths of different styles may be instantiated at different locations in the fabric. Flexible instantiation of datapaths of different styles may assist design teams in supporting a variety of designs that may have varying bandwidth and/or latency requirements.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bipolar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

For the purposes of the present disclosure, in addition to indicating components that may be operable to route packets, the term "router" may indicate various interconnect fabric building-block components, including various other components comprising datapaths and/or backbones. Accordingly, methods of mapping various datapath designs to particular router circuitries, for example, or of instantiating various backbones for particular datapaths, may be similarly applicable to mapping or instantiating various component designs to particular interconnect fabric building-block components.

For the purposes of the present disclosure, a first element may be "one-to-one coupled" to a second element when a third element merely couples the first element to the second element. In contrast, a first element may be "one-to-many coupled" to a plurality of second elements when a third element couples the first element to all of the second elements. Meanwhile, first elements may be coupled to second elements by "separate" coupling elements when the coupling elements are independent of each other, and in turn, coupling elements may be independent of each other when they are not connected to each other, and when none of them is driving any of the others.

Accordingly, when one or more first elements is "one-to-one coupled" to one or more second elements, each first element may be coupled to each of the second elements. Furthermore, when one or more first elements is one-to-one coupled to one or more second elements by "separate" third elements, each first element may be coupled by one independent third element to each of the second elements.

Likewise, when one or more first elements is "one-to-many coupled" to one or more second elements, each first element may be coupled to all of the of the second elements. Furthermore, when one or more first elements is one-to-many coupled to one or more second elements by "separate" third elements, each first element may be coupled by one independent third element to all of the second elements.

Figure 1:
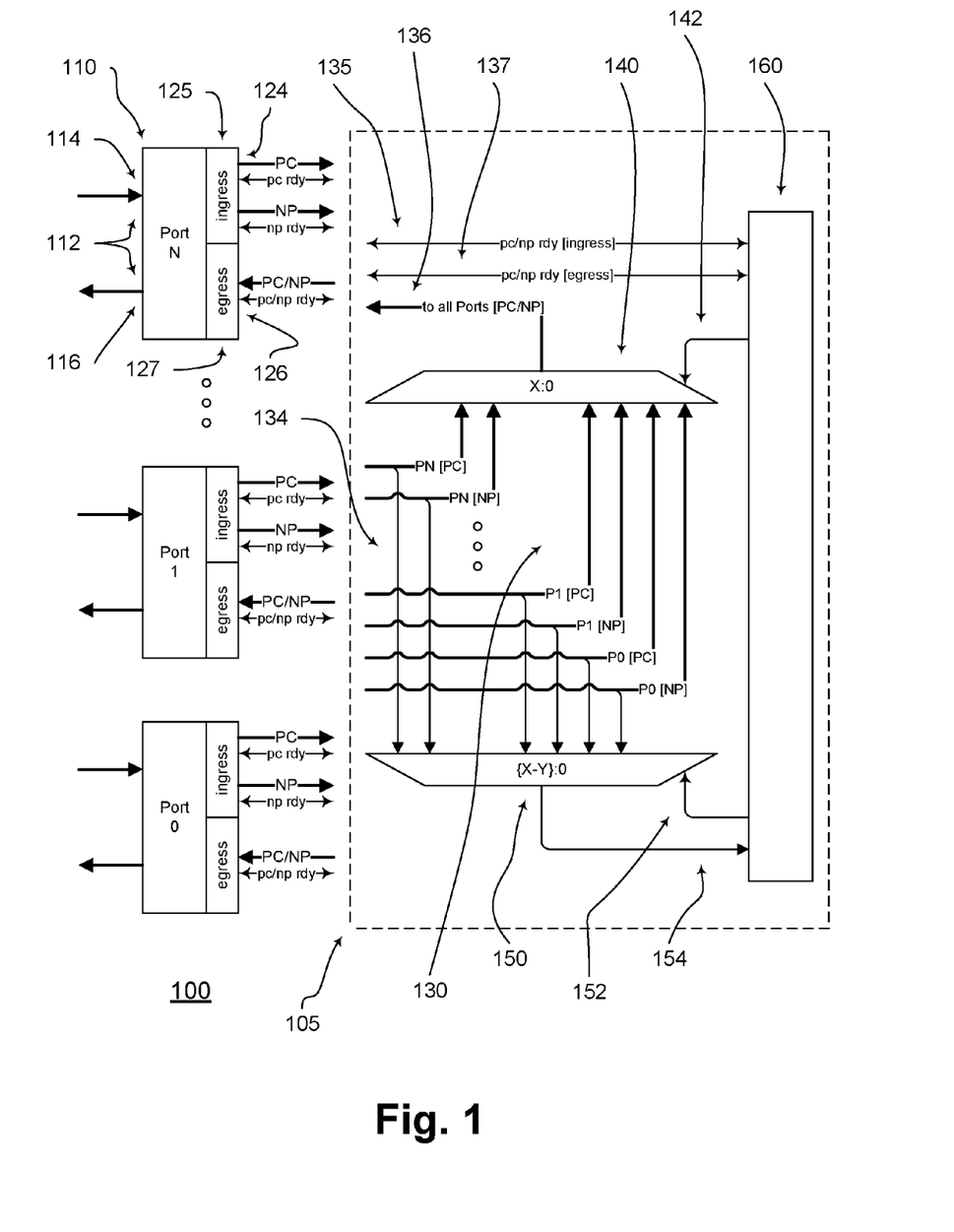
FIG. 1 illustrates a shared-bus router design, according to some embodiments of the disclosure.

FIG. 1 illustrates a shared-bus router design, according to some embodiments of the disclosure. In some embodiments, a plurality of ports may be coupled to an internal shared-bus backbone. When the ports receive inbound traffic, they may formulate requests for access to the shared-bus backbone and send them to a central arbiter. The central arbiter may then arbitrate between requests competing for access to the shared-bus backbone, and grant access to the shared-bus backbone to one port per clock cycle. Traffic may thereby be routed from one port to another.

In some embodiments, in FIG. 1, a shared-bus router circuitry 100 may include a plurality of ports 110, which may be enumerated 0 through N, and a shared-bus datapath 105. Each port 110 may have an external interface 112 including an external inbound interface 114 and an external outbound interface 116. External inbound interface 114 may be coupled to an ingress side 125 of port 110, and external outbound interface 116 may be coupled to an egress side 127 of port 110.

Ingress side 125 may have an inbound interface 124 for carrying inbound transactions to shared-bus datapath 105. Inbound interface 124 may couple ingress side 125 to one or more inbound busses. The ingress side 125 of each port 110—in combination with external inbound interface 114, inbound interface 124, or both—may effectively be part of an ingress port.

Inbound interface 124 may also couple ingress side 125 to one or more sets of input and/or output signals accompanying the various inbound busses, such as signals for implementing a handshake protocol for using shared-bus datapath 105. Examples of potential handshake protocols for using shared-bus datapath 105 include ready/acknowledge handshake protocols and request/grant handshake protocols.

Each inbound bus coupled to ingress side 125 may be dedicated to one or more types of inbound traffic, such as posted traffic, non-posted traffic, or completion traffic. For example, in some embodiments, inbound interface 124 may be coupled to a first inbound bus for carrying posted and/or completion transactions to shared-bus datapath 105, and may be coupled to a second inbound bus for carrying non-posted transactions to shared-bus datapath 105. In addition, for such embodiments, inbound interface 124 may be coupled to a first set of handshake protocol signals accompanying the first inbound bus, and may be coupled to a second set of handshake protocol signals accompanying the second inbound bus.

Egress side 127 may have an outbound interface 126 for carrying outbound transactions from shared-bus datapath 105. Outbound interface 126 may couple egress side 127 to one or more outbound busses. In some instances, the egress side 127 of each port 110 may be part of a logical and/or physical egress port, which may also include external outbound interface 116 and/or outbound interface 126.

Outbound interface 126 may also couple egress side 127 to one or more sets of input and/or output signals accompanying the various outbound busses, such as signals for implementing a handshake protocol for using egress side 127. Examples of potential handshake protocols for using egress side 127 include ready/acknowledge handshake protocols and request/grant handshake protocols.

Each outbound bus coupled to egress side 127 may be dedicated to one or more types of outbound traffic. For example, in some embodiments, outbound interface 126 may be coupled to one outbound bus for carrying posted, non-posted, and/or completion transactions from shared-bus datapath 105. In addition, for such embodiments, outbound interface 126 may be coupled to a set of handshake protocol signals accompanying the outbound bus.

Shared-bus datapath 105 may have a shared-bus backbone 130 and an arbitration circuitry 160, which may be a central arbiter for shared-bus datapath 105, and may be operable to arbitrate between ports 110 for the use of shared-bus backbone 130. Shared-bus backbone 130 may include a plurality of inbound busses 134 and an outbound bus 136. Each inbound bus 134 may be coupled to an inbound interface 124 of one of the ports 110, and outbound bus 136 may be coupled to an outbound interface 126 of each port 110. Outbound bus 136 may have the same width as inbound busses 134. In some embodiments, inbound busses 134 and outbound bus 136 may have a width of $X_1$ bits, which may be a predetermined number of bits for transmitting transactions through shared-bus datapath 105.

Shared-bus backbone 130 may also have a transaction multiplexor 140 and a transaction multiplexor select 142. Transaction multiplexor 140 may have a plurality of inputs coupled to inbound busses 134 and an output coupled to outbound bus 136. Transaction multiplexor 140 may be operable to selectively connect an inbound bus 134 to outbound bus 136 based upon transaction multiplexor select 142.

In addition, shared-bus backbone 130 may have a destination ID multiplexor 150, a destination ID multiplexor select 152, and a destination ID indicator 154. Destination ID multiplexor 150 may have a plurality of inputs coupled to subsets of the bits of one or more of inbound busses 134. Destination ID multiplexor 150 may also have an output coupled to destination ID indicator 154. Destination ID multiplexor 150 may be operable to selectively connect the subsets of the bits of inbound busses 134 to destination ID indicator 154 based upon destination ID multiplexor select 152.

Both the subsets of the bits of inbound busses 134 that are coupled to destination ID multiplexor 150, as well as destination ID indicator 154, may exclude $Y_1$ bits of inbound busses 134 and may accordingly have a width of $X_1$-$Y_1$ bits. These $X_1$-$Y_1$ bits may thereby serve to identify a destination port for the corresponding full $X_1$-bit transactions on inbound busses 134.

Arbitration circuitry 160 may use a shared routing table to process the $X_1$-$Y_1$ bits and determine which port 110 is the destination for the transaction on outbound bus 136 (as selected by transaction multiplexor select 142). In some embodiments, however, ingress sides 125 of ports 110 may be coupled to private routing tables to assist in routing inbound transactions. The private routing tables may either replace or augment the shared routing table.

Shared-bus backbone 130 may also have an inbound handshake bus 135 and an outbound handshake bus 137. The various handshake protocol signals of ingress sides 125 of the various ports 110 may be coupled to inbound handshake bus 135, which may aggregate handshake protocol signals extending between one or more ports 110 and arbitration circuitry 160. Inbound handshake bus 135 may couple the ingress sides 125 of ports 110 to arbitration circuitry 160, and ingress side 125 of each port 110 may thereby carry out a handshake protocol with arbitration circuitry 160.

Inbound handshake bus 135 may include a request indicator from each ingress side 125, by which each ingress side 125 may request access to shared-bus backbone 130 through a corresponding inbound bus 134. The request indicators from each ingress side 125 may, for example, initiate a handshake protocol with arbitration circuitry 160. Accordingly, in various embodiments, one or more ingress side 125 may be coupled to arbitration circuitry 160, with each ingress side 125 being coupled by a separate request indicator to arbitration circuitry 160. In other words, one or more of ingress sides 125 may be one-to-one coupled to arbitration circuitry 160, by separate request indicators. In some embodiments, each ingress side 125 may be one-to-one coupled to arbitration circuitry 160, by separate request indicators.

Similarly, the various handshake protocol signals of egress side 127 may be coupled to an outbound handshake bus 137 of shared-bus backbone 130, which may aggregate handshake protocol signals extending between arbitration circuitry 160 and one or more ports. Outbound handshake bus 137 may couple arbitration circuitry 160 to egress sides 127 of ports 110, and arbitration circuitry 160 may thereby carry out a handshake protocol with egress side 127 of each port 110.

Outbound handshake bus 137 may include request indicators from arbitration circuitry 160, by which arbitration circuitry 160 may request access to the various egress sides 127 through shared-bus backbone 130. Each of the request indicators from arbitration circuitry 160 may, for example, initiate handshake protocols with a corresponding egress side 127. Accordingly, in various embodiments, arbitration circuitry 160 may be coupled to one or more egress sides 127, with arbitration circuitry 160 being coupled by a separate egress-request indicator to each egress side 127. In other words, arbitration circuitry 160 may be one-to-one coupled to one or more of egress sides 127, by separate egress-request indicators. In some embodiments, arbitration circuitry 160 may be one-to-one coupled to each egress side 127, by separate egress-request indicators.

Some transactions sent between ports 110 may be single-flit transactions, and may be transferred through outbound bus 136 in a single clock cycle. Other transactions may be multiple-flit transactions, and may require multiple clock cycles in order to be transferred through outbound bus 136. For multiple-flit transactions, in some embodiments, a handshake protocol and associated arbitration may grant access to outbound bus 136 for a number of clock cycles required to transfer the transaction through outbound bus 136. In other embodiments, the handshake protocol and associated arbitration may grant access to outbound bus 136 for one clock cycle at a time, and access to outbound bus 136 may be interleaved between multiple competing ports 110.

Furthermore, some ports 110 may have native flit-widths of less than $X_1$ bits. The ingress side 125 of such ports 110 may include buffering operable to accumulate multiple flits into a single flit of $X_1$ bits, which may then be passed to inbound interface 124. Similarly, the egress side 127 of such ports 110 may include buffering operable to hold and parcel out a single flit of $X_1$ bits into multiple flits of the port's native flit-width, which may then be passed to external outbound interface 116.

In operation, a port 110 may receive an inbound transaction on its external inbound interface 114. The transaction may be passed to its ingress side 125, which may place the transaction on an inbound bus of the port's inbound interface 124. The inbound bus may in turn be coupled to one of inbound busses 134. Meanwhile, ingress side 125 may initiate a handshake protocol with arbitration circuitry 160 via a set of signals accompanying the inbound bus, which may in turn be coupled through inbound handshake bus 135 to arbitration circuitry 160.

Arbitration circuitry 160 may indicate to destination ID multiplexor 150, via destination ID multiplexor select 152, an inbound bus from which destination ID information may be gathered. Destination ID multiplexor 150 may then place a subset of the bits of the transaction (which may serve to identify the destination port for the transaction) on destination ID indicator 154, and arbitration circuitry 160 may use a shared routing table to process the Destination ID information.

Arbitration circuitry 160 may arbitrate between any ports requesting access to outbound bus 136. Upon determining the winning port, arbitration circuitry 160 may indicate the winning port (and type of inbound traffic, if applicable) to transaction multiplexor 140 via transaction multiplexor select 142. Transaction multiplexor 140 may place the transaction on outbound bus 136.

Meanwhile, arbitration circuitry 160 may initiate a handshake protocol with the egress side 127 of the destination port 110 via outbound handshake bus 137. The transaction may then be passed from outbound bus 136 through egress side 127 of the destination port 110, which may place the transaction on external outbound interface 116.

Figure 2:
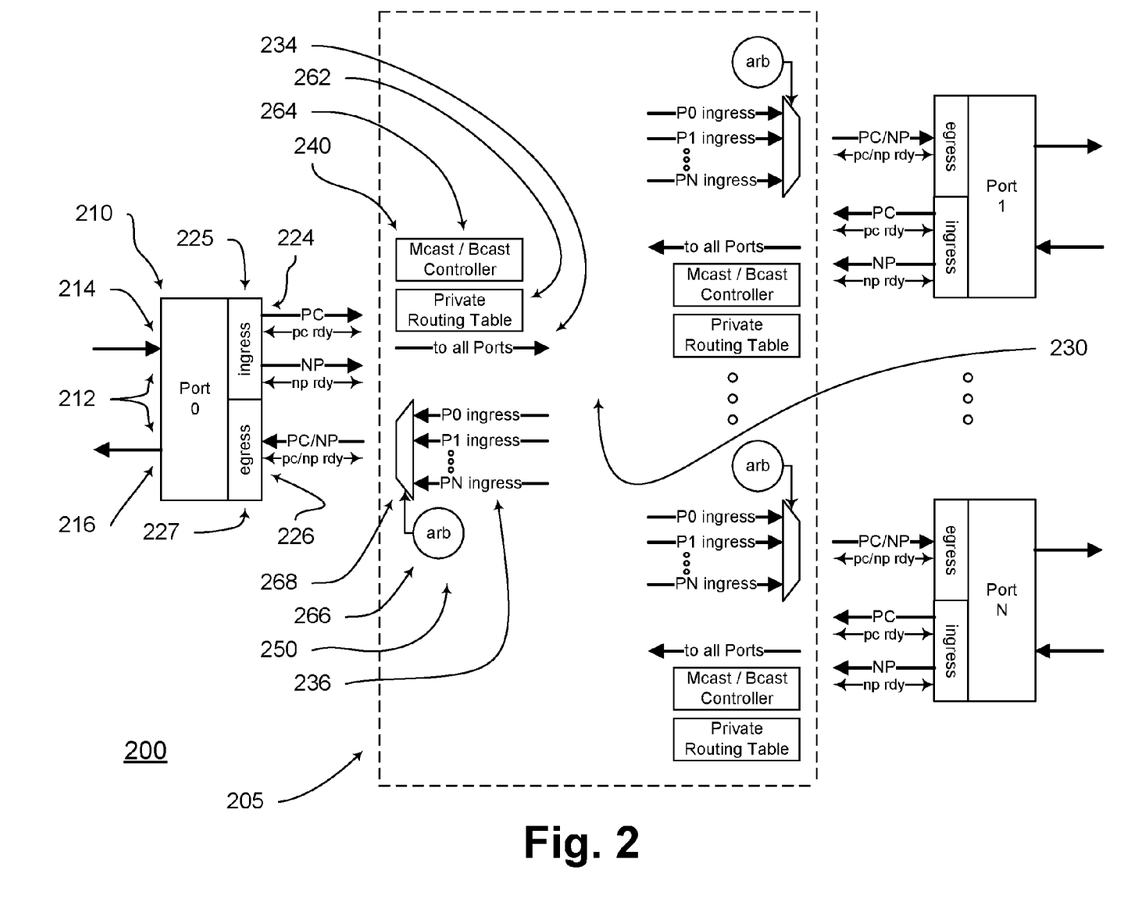
FIG. 2 illustrates a crossbar router design, according to some embodiments of the disclosure.

FIG. 2 illustrates a crossbar router design, according to some embodiments of the disclosure. In some embodiments, a plurality of ports may be coupled to an internal crossbar backbone, in which each port is independently coupled to each other port. When the ports receive inbound traffic, they may formulate requests for access to the destination ports and send them to the destination ports. Each destination port may then arbitrate between requests competing for access to the egress side of that particular port, and grant access to one port per clock cycle, thereby routing traffic from one or more ports to one or more other ports.

In some embodiments, in FIG. 2, a crossbar router circuitry 200 may include a plurality of ports 210, which may be enumerated 0 through N, and a crossbar datapath 205. Each port 210 may have an external interface 212 including an external inbound interface 214 and an external outbound interface 216. External inbound interface 214 may be coupled to an ingress side 225 of port 210, and external outbound interface 216 may be coupled to an egress side 227 of port 210. Ports 210 may be substantially similar to ports 110 of router circuitry 100.

Ingress side 225 may have an inbound interface 224 for carrying inbound transactions to crossbar datapath 205. Inbound interface 224 may couple ingress side 225 to one or more inbound busses. The ingress side 225 of each port 210—in combination with external inbound interface 214, inbound interface 224, or both—may effectively be part of an ingress port.

Inbound interface 224 may also couple ingress side 225 to one or more sets of input and/or output signals accompanying the various inbound busses, such as signals for implementing a handshake protocol for using crossbar datapath 205. Examples of potential handshake protocols for using crossbar datapath 205 include ready/acknowledge handshake protocols and request/grant handshake protocols.

Each inbound bus coupled to ingress side 225 may be dedicated to one or more types of inbound traffic, such as posted traffic, non-posted traffic, or completion traffic. For example, in some embodiments, inbound interface 224 may be coupled to a first inbound bus for carrying posted and/or completion transactions to crossbar datapath 205, and may be coupled to a second inbound bus for carrying non-posted transactions to crossbar datapath 205. In addition, for such embodiments, inbound interface 224 may be coupled to a first set of handshake protocol signals accompanying the first inbound bus, and may be coupled to a second set of handshake protocol signals accompanying the second inbound bus.

Egress side 227 may have an outbound interface 226 for carrying outbound transactions from crossbar datapath 205. Outbound interface 226 may couple egress side 227 to one or more outbound busses. In some embodiments, the egress side 227 of each port 210 may be part of a logical and/or physical egress port, which may also include external outbound interface 216 and/or outbound interface 226.

Outbound interface 226 may also couple egress side 227 to one or more sets of input and/or output signals accompanying the various outbound busses, such as signals for implementing a handshake protocol for using egress side 227. Examples of potential handshake protocols for using egress side 227 include ready/acknowledge handshake protocols and request/grant handshake protocols.

Each outbound bus coupled to egress side 227 may be dedicated to one or more types of outbound traffic. For example, in some embodiments, outbound interface 226 may be coupled to an outbound bus for carrying posted, non-posted, and/or completion transactions from the shared-bus backbone. In such embodiments, outbound interface 226 may be coupled to a set of handshake protocol signals accompanying the outbound bus.

Crossbar datapath 205 may have a crossbar backbone 230, which may include one or more pairs of an inbound circuitry 240 and an outbound circuitry 250 corresponding to one or more ports 210. As discussed below, inbound circuitries 240 and outbound circuitries 250 may be operable to arbitrate between ports 210 for the use of crossbar backbone 230.

Crossbar backbone 230 may also include, for one or more of ports 210, one or more corresponding inbound busses 234 and one or more corresponding outbound busses 236. Inbound busses 234 and outbound busses 236 may have a width of $X_2$ bits, which may be a predetermined number of bits for transmitting transactions through crossbar datapath 205. Inbound busses 234 corresponding to a particular port 210 may be coupled to the inbound interfaces 224 of the corresponding port 210. The inbound busses 234 corresponding to a particular port 210 may then be coupled to the outbound busses 236 of the other ports 210.

The outbound circuitry 250 of any particular port 210 may include a per-port arbitration circuitry 266 and a multiplexor 268. The multiplexor 268 corresponding to any particular port 210 may have an output coupled to the outbound interface 226 of the corresponding port 210, and may have a plurality of inputs coupled to the outbound busses 236 of one or more of the other ports 210. Multiplexors 268 may be operable to selectively connect an outbound bus 236 to outbound interface 226 of the corresponding port 210.

Inbound circuitries 240 may include a routing table 262 and a multicast/broadcast controller 264. The routing table 262 for any particular port 210 may indicate which of the other ports 210 may be targeted by a particular inbound transaction. The various handshake protocol signals of ingress sides 225 of any particular port 210 may be coupled to the routing table 262 and multicast/broadcast controller 264 corresponding to that port 210. The routing table 262 and multicast/broadcast controller 264 may in turn be coupled to the arbitration circuitries 266 corresponding to one or more of the other ports 210. The inbound circuitry 240 of any particular port 210 may thereby carry out a handshake protocol with the arbitration circuitries 266 of one or more of the other ports 210.

In various embodiments, the ingress side 225 of one or more port 210 may be coupled to the arbitration circuitries 266 of one or more of the other ports 210, with each ingress side 225 being coupled by a separate request indicator to each arbitration circuitry 266. For example, the ingress side 225 of one or more port 210 may be one-to-many coupled to the arbitration circuitries 266 of one or more of the other ports 210, by separate request indicators. In some embodiments, each ingress side 225 may be one-to-many coupled to the arbitration circuitry 266 of each other port 210, by separate request indicators.

The arbitration circuitry 266 of any particular port 210 may also be coupled to the various handshake protocol signals of the egress side 227 corresponding to that port 210. The arbitration circuitry 266 of any particular port 210 may thereby carry out a handshake protocol with egress side 227 of the corresponding port 210.

Multicast/broadcast controllers 264 of inbound circuitries 240 may help crossbar backbone 230 support multicast and/or broadcast capabilities. The multicast/broadcast controller 264 of one or more ports 210 may be coupled to the ingress side 225 of the corresponding port 210.

In addition, in various embodiments, the multicast/broadcast controller 264 of one or more ports 210 may be coupled to the outbound circuitries 250 of one or more of the other ports 210, with each multicast/broadcast controller 264 being coupled by separate request indicator to the outbound circuitries 250 of each of the other ports 210. For example, the multicast/broadcast controllers 264 of one or more ports 210 may be one-to-many coupled to the outbound circuitries 250 of one or more of the other ports 210, by separate request indicators. In some embodiments, the multicast/broadcast controller 264 of each port 210 may be one-to-many coupled to the outbound circuitry 250 of every other port 210.

A multicast/broadcast controller 264 may initiate a handshake protocol with the arbitration circuitries 266 corresponding to two or more destination ports 210. When the arbitration circuitries 266 corresponding with each of the targeted destination ports have granted access to the egress sides 227 of the corresponding ports 210, and when the arbitration circuitries 266 indicate that the flit being multicast/broadcast has been passed through the egress sides of each targeted destination port 210, the multicast/broadcast controller 264 may then end the handshake protocol, and the ingress side 225 corresponding with the multicast/broadcast controller 264 may be free to proceed to the next flit. For single-flit transactions, the multicast/broadcast controller may be free to proceed to the next transaction.

Some transactions sent between ports 210 may be single-flit transactions, and may be transferred through outbound busses 236 in a single clock cycle. Other transactions may be multiple-flit transactions, and may require multiple clock cycles in order to be transferred through outbound busses 236. For multiple-flit transactions, a handshake protocol and associated arbitration may grant access to an egress side 227 of any particular port 210 for number of clock cycles required to transfer the transaction through the egress side 227. In some embodiments, however, the handshake protocol and associated arbitration may grant access to an egress side 227 of any particular port 210 for one clock cycle at a time, and access to the egress side 227 may be interleaved between multiple competing ports 210.

Furthermore, some ports 210 may have native flit-widths of less than $X_2$ bits. The inbound side 225 of such ports 210 may include buffering to accumulate multiple flits into a single flit of $X_2$ bits, which may then be passed to inbound interface 224. Similarly, the outbound side 227 of such ports 210 may include buffering to hold and parcel out a single flit of $X_2$ bits into multiple flits of the port's native flit-width, which may then be passed to external outbound interface 216.

In operation, a port 210 may receive an inbound transaction on external inbound interface 214. The transaction may be passed to ingress side 225 of the port, which may place the transaction on an inbound bus of the port's inbound interface 224, which may in turn be coupled to one of inbound busses 234. At the same time, ingress side 225 may initiate a handshake protocol with arbitration circuitry 266 of the destination port 210.

Arbitration circuitry 266 may then arbitrate between any ports 210 requesting access to the outbound interface 226 corresponding to the arbitration circuitry 266. Upon determining the winning port, arbitration circuitry 266 may indicate the winning port (and type of inbound traffic, if applicable) to multiplexor 268.

Arbitration circuitry 266 may then initiate a handshake protocol with the egress side 227 of the destination port, and the transaction may pass from multiplexor 268 to outbound interface 226 and through egress side 227 of the destination port, which may in turn place the transaction on the corresponding external outbound interface 216.

Figure 3:
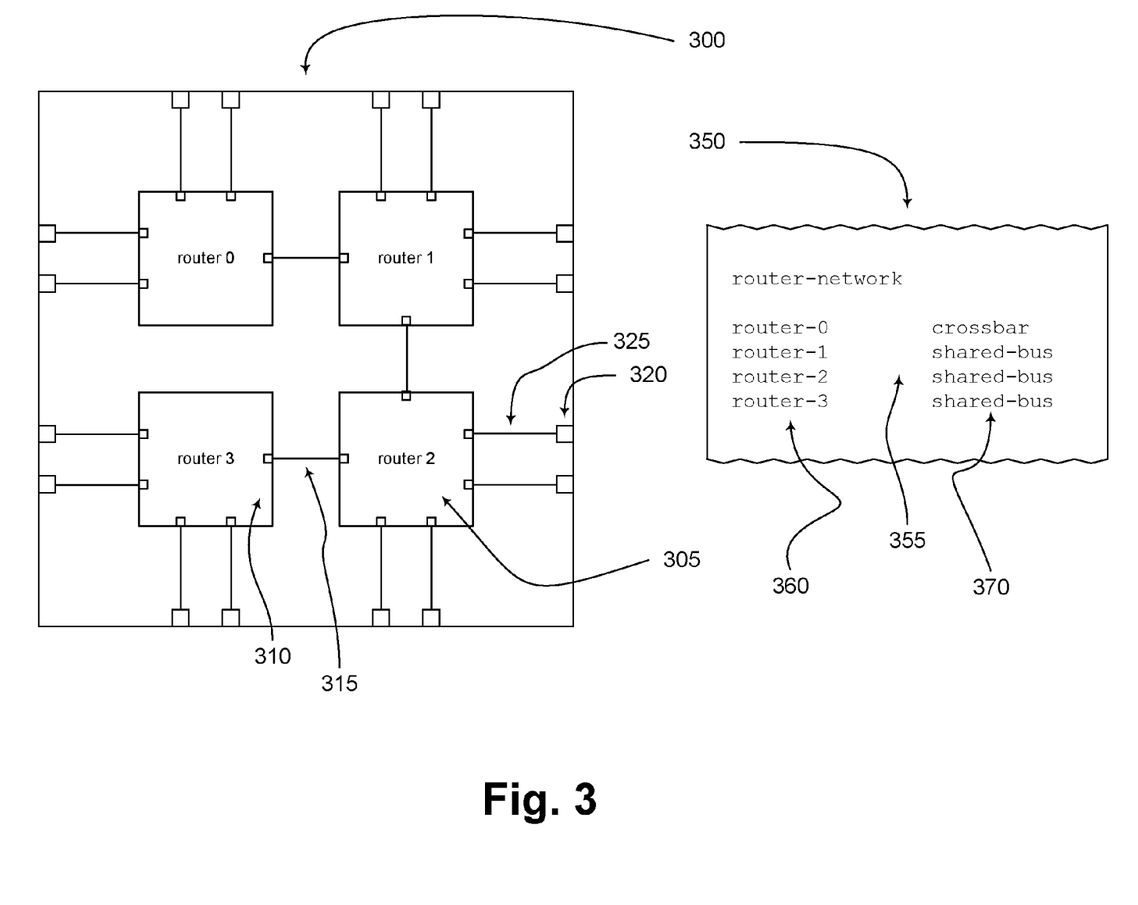
FIG. 3 illustrates an interconnect fabric incorporating a plurality of routers in accordance with some embodiments.

FIG. 3 illustrates an interconnect fabric incorporating a plurality of routers in accordance with some embodiments. More particularly, fabric circuitry 300 may include a plurality of router circuitries 305, a plurality of internally-connected busses 315, a plurality of external interfaces 320, and a plurality of externally-connected busses 325.

Each of router circuitries 305 may have a plurality of ports 310. For each of router circuitries 305, one or more of its ports 310 may be internally-facing or internally-oriented, and one or more of its ports 310 may be externally-facing or externally-oriented. Each internally-facing port 310 may be coupled by an internally-connected bus 315 to an internally-facing port 310 on another router circuitry 305. Similarly, each externally-facing port 310 may be coupled by an externally-connected bus 325 to an external interface 320.

Each router circuitry 305 may have either a shared-bus datapath design or a crossbar datapath design. Accordingly, any particular router circuitry 305 may be substantially similar to shared-bus router circuitry 100, or may be substantially similar to crossbar router circuitry 200.

The datapath design used for each router circuitry 305 may be specified by a design file 350, which may be a data file stored on a machine-readable storage media. Such machine readable storage media may include any of a variety of storage media, like magnetic storage media (e.g. magnetic tapes or magnetic disks), optical storage media (e.g. optical discs), electronic storage media (e.g. conventional hard disk drives, solid-state disk drives, or flash-memory-based storage media), or any other tangible storage media or non-transitory storage media.

In some embodiments, the datapath design used for each router circuitry 305 may be stored in any number of design files. For example, the datapath design used for each router circuitry 305 may be stored in one design file per router circuitry 305. More generally, the datapath design used for each router circuitry 305 may be stored in one or more design files, each storing the datapath design used for one or more router circuitries 305.

In some embodiments, design file 350 may be a text file specifying a register transfer language (RTL) description of a logic design or circuit design, or specifying a configuration of an RTL design. The language in which the RTL description is rendered may be, for example, VHDL (Very high speed integrated circuit Hardware Description Language), or Verilog, or any other language for specifying a logic design or circuit design. In other embodiments, design file 350 may be a non-text file specifying a non-textual description of a logic design or circuit design, such as a compiled or binary representation of a logic design or circuit design.

Design file 350 may be loaded into or otherwise processed by a software program. In other words, design file 350 may be processed and/or compiled by various predetermined sets of executable instructions stored on a machine-readable storage media, such as one or more predetermined software programs. In embodiments in which design file 350 is a text file specifying an RTL description of a logic design or circuit design, design file 350 may be processed by a word processing program or other program for interacting with the text of a text file. Other software programs that may be operable to process design file 350 may include various programs for front-end or back-end logic design or circuit design.

Design file 350 may include a mapping 355 in which one or more router instances 360 are mapped to or otherwise associated with datapath designs 370. Possible datapath designs 370 may include a shared-bus datapath design or a crossbar datapath design.

Mapping 355 may follow a predetermined convention for associating router instances 360 with datapath designs 370. For example, in some embodiments in which design file 350 is a text file, mapping 355 may be a table in which router instances 360 are presented in one column (or row) while datapath designs 370 are presented in another column (or row). In other embodiments, mapping 355 may be a series of rows with at least two character strings each, one of which may be a router instance 360 and another of which may be a datapath design 370. In embodiments in which design file 350 is a text file, mapping 355 may take the form of header information to be processed by a software program. Design file 350 may also specify other instance-specific configuration attributes in addition to specifying a datapath design.

Design file 350 may be one file in a library, collection, or set of files specifying one or more designs. Design file 350, and/or one or more of the other files in the library, may specify a design for a shared-bus datapath, a design for a crossbar datapath, and a design for fabric circuitry 300 instantiating a plurality of router circuitries 305. In some embodiments, such designs may be specified in an RTL language. In various embodiments, one or more of design files 350 may be a configuration file, and may contain a mapping of a router instance to a datapath design, but may not necessarily specify an RTL description of a logic design or circuit design, and may not necessarily include a compiled or binary representation of a logic design or circuit design.

Programs for front-end or back-end logic design or circuit design may load, compile, parse, or otherwise process design file 350. When design file 350 and any other files in the library specifying such designs are processed by one or more front-end or back-end logic design or circuit design programs, mapping 355 may establish the particular datapath design 370 to be used by the program for each router instance 360 in fabric circuitry 300. Mapping 355 may accordingly serve to configure the particular datapath designs to be used by one or more router instances in an interconnect fabric when processed by a predetermined program.

Figure 4:
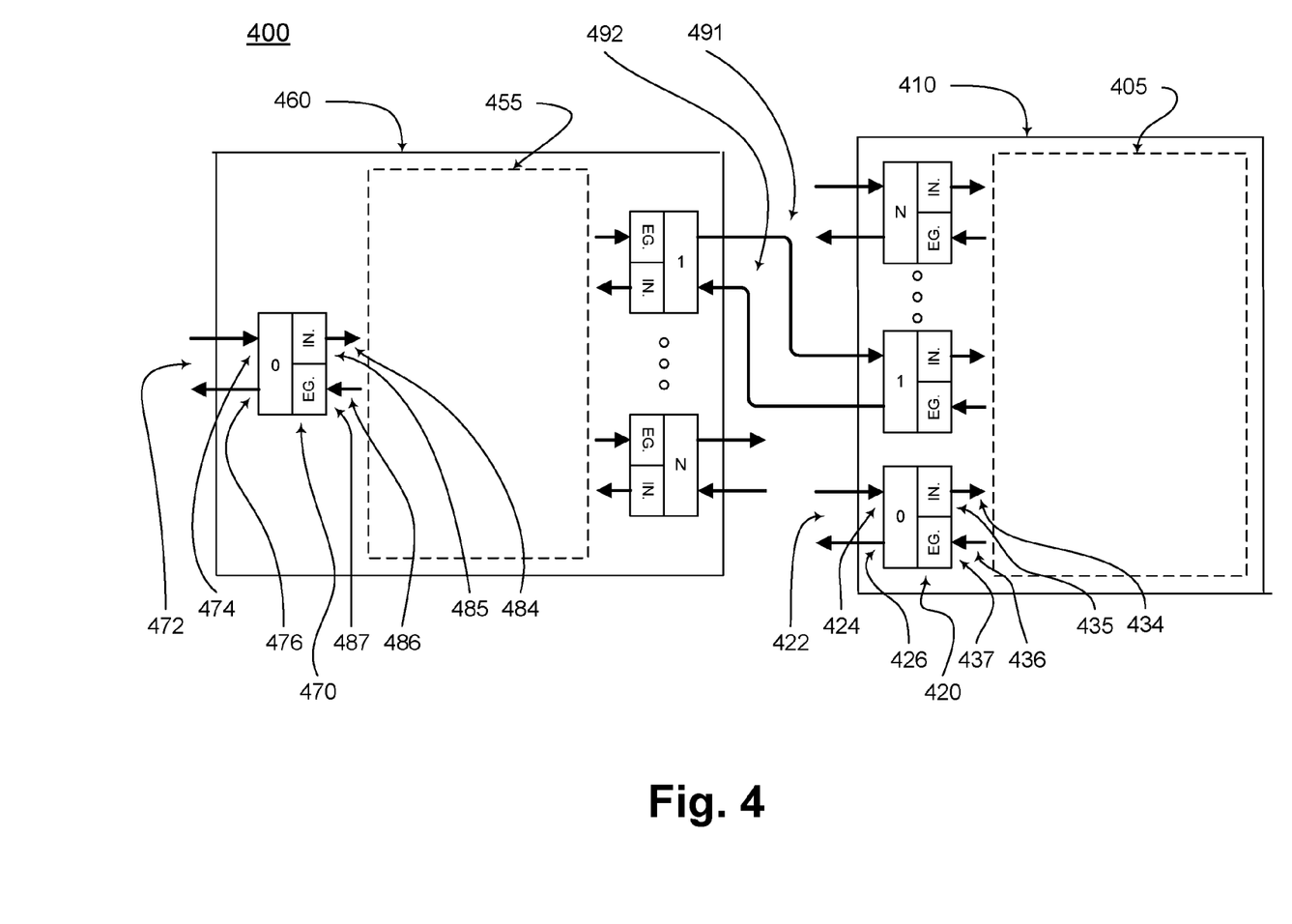
FIG. 4 illustrates a portion of an interconnect fabric incorporating at least one shared-bus router and at least one crossbar router, in accordance with some embodiments.

FIG. 4 illustrates a portion of an interconnect fabric incorporating at least one shared-bus router and at least one crossbar router, in accordance with some embodiments. Fabric circuitry portion 400 may be a portion of an interconnect fabric substantially similar to fabric circuitry 300, or a portion of another interconnect fabric including a plurality of router circuitries. Fabric circuitry portion 400 may include a first router circuitry 410 and a second router circuitry 460.

First router circuitry 410 may include a shared-bus datapath 405 and a plurality of ports 420, which may accordingly be shared-bus ports, and which may be enumerated 0 through N. First router circuitry 410 may be substantially similar to shared-bus router circuitry 100, and shared-bus datapath 405 may be substantially similar to shared-bus datapath 105.

Similarly, second router circuitry 460 may include a crossbar datapath 455 and a plurality of ports 470, which may accordingly be crossbar ports, and which may be enumerated 0 through N. Second router circuitry 460 may be substantially similar to crossbar router circuitry 200, and crossbar datapath 455 may be substantially similar to crossbar datapath 205.

Each of ports 420 may have an ingress side 435, an external inbound interface 424, and an inbound interface 434. Each of ports 420 may also have an egress side 437, an external outbound interface 426, and an outbound interface 436. External inbound interface 424 and external outbound interface 426 may be portions of an external interface 422. Each ingress side 435 (along with the corresponding external inbound interface 424 and/or inbound interface 434) may be part of an ingress port. Similarly, each egress side 437 (along with the corresponding outbound interface 436 and/or external outbound interface 426) may be part of an egress port.

Each of ports 470 may have an ingress side 485, an external inbound interface 474, and an inbound interface 484. Each of ports 470 may also have an egress side 487, an external outbound interface 476, and an outbound interface 486. External inbound interface 474 and external outbound interface 476 may be portions of an external interface 472. Each ingress side 485 (along with the corresponding external inbound interface 474 and/or inbound interface 484) may be part of an ingress port. Similarly, each egress side 487 (along with the corresponding outbound interface 486 and/or external outbound interface 476) may be part of an egress port.

One or more of ports 420 may be interconnected with one or more of ports 470. More particularly, as depicted in FIG. 4, fabric circuitry portion 400 may include a first bus 491 and a second bus 492. First bus 491 may couple an external outbound interface 476 of one of ports 470 to an external inbound interface 424 of one of ports 420. In a complementary fashion, second bus 492 may couple an external outbound interface 426 of one of ports 420 to an external inbound interface 474 of one of ports 470. Shared-bus datapath 405 may accordingly be coupled to crossbar datapath 455 through first bus 491 and second bus 492.

In various embodiments, at least one of ports 420 may be one-to-one coupled to at least one of ports 470. More particularly, at least one ingress port of shared-bus datapath 405 may be one-to-one coupled to at least one egress port of crossbar datapath 455, and at least one egress port of shared-bus datapath 405 may be one-to-one coupled to at least one ingress port of crossbar datapath 455. In various other embodiments, at least two ingress ports of shared-bus datapath 405 may be one-to-one coupled to at least two egress ports of crossbar datapath 455, and at least two egress ports of shared-bus datapath 405 may be one-to-one coupled to at least two egress ports of crossbar datapath 455.

With reference to both FIGS. 3 and 4, an interconnect fabric may be substantially similar to fabric circuitry 300, or may have another configuration. Each router circuitry may include a datapath and a plurality of ports. In various configurations, a port of one or more of the router circuitries in the interconnect fabric may be coupled to a port of another router circuitry. An interconnect fabric may accordingly have various interconnected router circuitries. For example, an interconnect fabric may have a configuration of a network or mesh of router circuitries, or a tree of router circuitries. In some embodiments, the interconnect fabric may be a network, such as a Network-on-a-Chip.

The logic design or circuit design of the interconnect fabric may then be specified in one or more design files, each of which may be a text-file (which may be processed by a word processing program) or a non-text file (which may be processed by a program for front-end or back-end logic design or circuit design). The one or more design files may include a mapping operable to configure which datapath design may be used for each router instance in the fabric.

The ports in any particular router circuitry may have the same interface and protocol whether the corresponding datapath is a shared-bus datapath or a crossbar datapath. Therefore, the mapping in the one or more design files may advantageously be altered relatively quickly and easily to adjust the datapath design to be used for each router instance.

Figure 5:
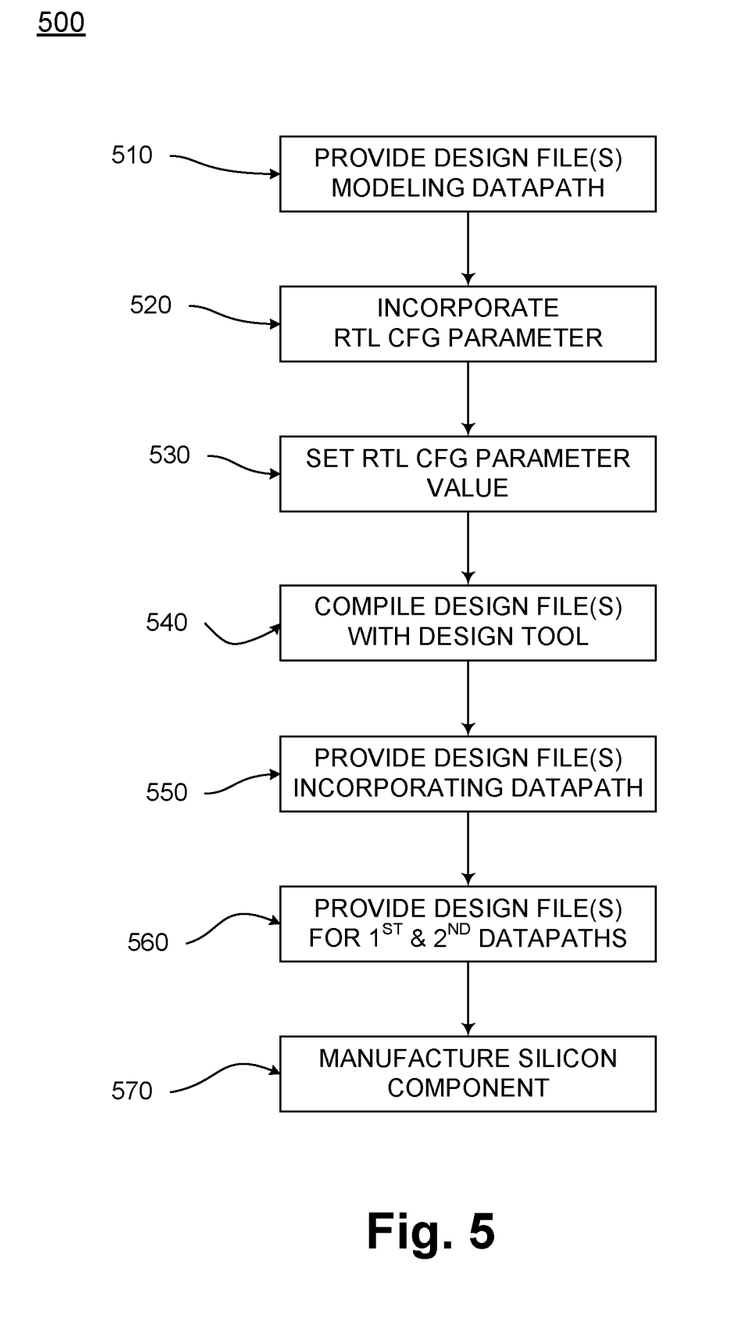
FIG. 5 illustrates a method for configuring an interconnect fabric having at least one datapath, in accordance with some embodiments.

FIG. 5 illustrates a method for configuring an interconnect fabric having at least one datapath, in accordance with some embodiments. The interconnect fabric may be a network, such as a Network-on-a-Chip. Method 500 may include one or more of a provision 510, an incorporation 520, and/or a setting 530. In provision 510, one or more design files may be provided. The one or more design files may model a datapath having a plurality of ports, a shared-bus backbone coupling the plurality of ports, and a crossbar backbone coupling the plurality of ports. In incorporation 520, a configuration parameter for the datapath may be incorporated in the one or more design files. In setting 530, a value of the configuration parameter may be set to one of a first value and a second value.

The one or more design files may be operable to be loaded by a design tool, which may be as a front-end or back-end logic design or circuit design program. For example, the design tool may be a synthesis program or tool, or may be a timing analysis program or tool. The one or more design files may be operable to instantiate the shared-bus datapath when the configuration parameter is set to the first value, and the one or more design files may be operable to instantiate the crossbar datapath when the configuration parameter is set to the second value.

In some embodiments, one or more of the design files may be an RTL file specifying an RTL description of a logic design or circuit design. Similarly, one or more of the design files may be a compiled or binary representation of a logic design or circuit design. In some embodiments, the configuration parameter may be exposed to accept a value, such as by being exposed to a user, or by being exposed to the design tool. In turn, a user or a design tool may set the exposed configuration parameter to a value. For example, the design tool may provide a mechanism for a user to enter a value for the configuration parameter. Once the user has entered the value using the provided mechanism, the design tool may propagate the value to an RTL description of a logic design or circuit design, or to a compiled or binary representation of a logic design or circuit design. Alternatively, a design tool may provide an automatable mechanism for enter a value for the configuration parameter. The automatable mechanism may be, for example, a command-line switch for the design tool, or an initializing file or configuring file for the design tool itself, which may be capable of providing a value that the design tool may then enter for the configuration parameter.

Method 500 may also include one or more of a compiling 540, a provision 550, a provision 560, and/or a manufacturing 570. In compiling 540, the one or more design files may be compiled with the design tool. In provision 550, one or more design files modeling a circuitry incorporating at least one instance of the datapath may be provided. In provision 560, one or more design files modeling a circuitry incorporating at least a first instance of the datapath and a second instance of the datapath may be provided. The first instance of the datapath may be coupled to a port of the second instance of the datapath. In manufacturing 570, a silicon component incorporating the datapath may be manufactured.

Although the actions in the flowchart with reference to FIG. 5 are shown in a particular order, the order of the actions can be modified. Thus, the illustrated embodiments can be performed in a different order, and some actions may be performed in parallel. Some of the actions and/or operations listed in FIG. 5 are optional in accordance with certain embodiments. The numbering of the actions presented is for the sake of clarity and is not intended to prescribe an order of operations in which the various actions must occur. Additionally, operations from the various flows may be utilized in a variety of combinations.

In some embodiments, machine readable storage media may have executable instructions that, when executed, cause one or more processors to perform an operation comprising method 500. Such machine readable storage media may include any of a variety of storage media, like magnetic storage media (e.g. magnetic tapes or magnetic disks), optical storage media (e.g. optical discs), electronic storage media (e.g. conventional hard disk drives, solid-state disk drives, or flash-memory-based storage media), or any other tangible storage media or non-transitory storage media.

Figure 6:
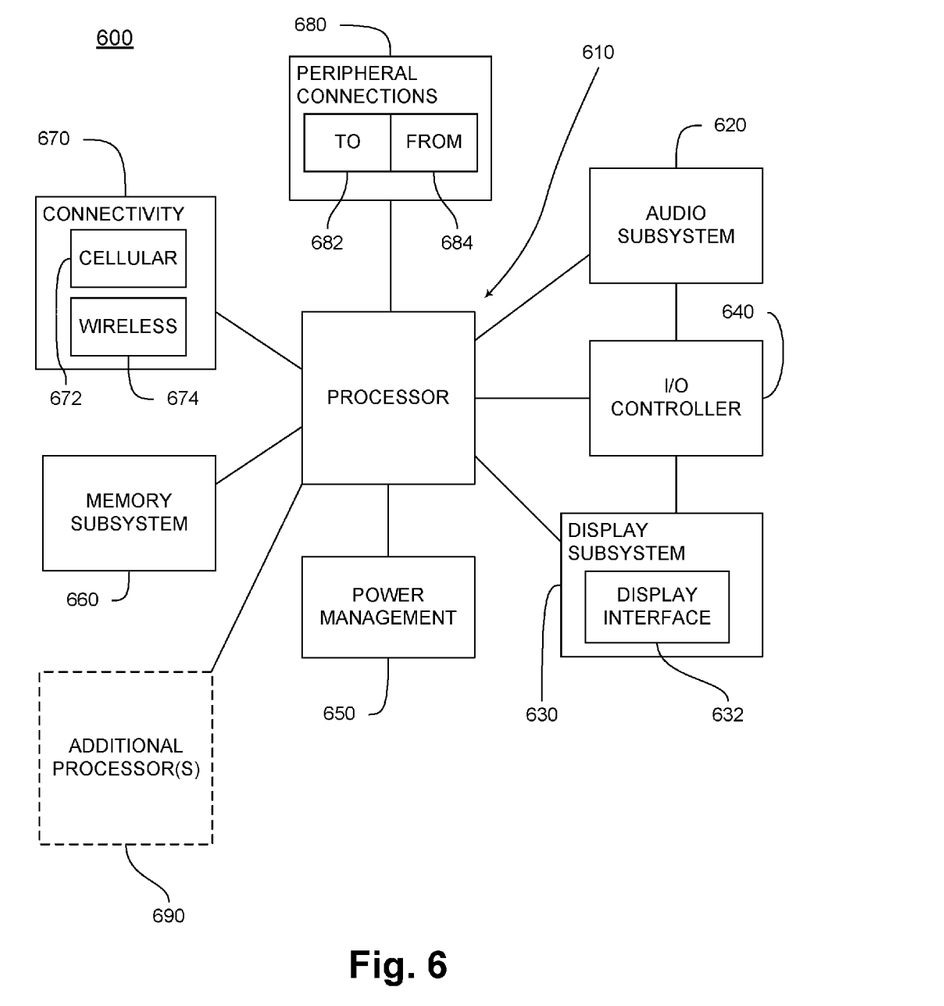
FIG. 6 illustrates a computing device with a datapath according to some embodiments of the disclosure.

FIG. 6 illustrates a computing device with a datapath according to some embodiments of the disclosure. It is pointed out that those elements of FIG. 6 having the same reference numbers (or names) as the elements of any other figure can operate or function in any manner similar to that described, but are not limited to such. More particularly, computing device 600 may be a computer system, an SoC, a smart device, a smart phone, or a tablet with a datapath, according to some embodiments of the disclosure. It will be understood that certain components of computing device 600 are shown generally, and not all components of such a device are shown in FIG. 6. Moreover, while some of the components may be physically separate, others may be integrated within the same physical package, or even on the same physical silicon die. Accordingly, the separation between the various components as depicted in FIG. 6 may not be physical in some cases, but may instead be a functional separation. It is also pointed out that those elements of FIG. 6 having the same names or reference numbers as the elements of any other figure can operate or function in any manner similar to that described, but are not limited to such.

In various embodiments, the components of computing device 600 may include any of a processor 610, an audio subsystem 620, a display subsystem 630, an I/O controller 640, a power management component 650, a memory subsystem 660, a connectivity component 670, one or more peripheral connections 680, and one or more additional processors 690. In some embodiments, processor 610 may include a datapath according to some embodiments discussed. In various embodiments, however, any of the components of computing device 600 may include the datapath of some embodiments. In addition, one or more components of computing device 600 may include an interconnect fabric having a plurality of ports, such as a router, a network of routers, or a Network-on-a-chip (NoC).

Processor 610 may include one or more physical devices, such as microprocessors, application processors, microcontrollers, programmable logic devices, or other processing means. The processing operations performed by processor 610 may include the execution of an operating platform or operating system on which applications and/or device functions may then be executed. The processing operations may also include operations related to one or more of the following: I/O (input/output) with a human user or with other devices; power management; connecting computing device 600 to another device; audio I/O; and/or display I/O.

Audio Subsystem 620 may include hardware components (e.g., audio hardware and audio circuits) and software components (e.g., drivers and/or codecs) associated with providing audio functions to computing device 600. Audio functions can include speaker and/or headphone output as well as microphone input. Devices for such functions can be integrated into computing device 600, or connected to computing device 600. In one embodiment, a user interacts with computing device 600 by providing audio commands that are received and processed by processor 610.

Display subsystem 630 may include hardware components (e.g., display devices) and software components (e.g., drivers) that provide a visual and/or tactile display for a user to interact with computing device 600. Display subsystem 630 may include a display interface 632, which may be a particular screen or hardware device used to provide a display to a user. In one embodiment, display interface 632 includes logic separate from processor 610 to perform at least some processing related to the display. In some embodiments, display subsystem 630 includes a touch screen (or touch pad) device that provides both output and input to a user.

I/O controller 640 may include hardware devices and software components related to interaction with a user. I/O controller 640 is operable to manage hardware that is part of audio subsystem 620 and/or display subsystem 630. Additionally, I/O controller 640 may be a connection point for additional devices that connect to computing device 600, through which a user might interact with the system. For example, devices that can be attached to computing device 600 might include microphone devices, speaker or stereo systems, video systems or other display devices, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of computing device 600. Additionally, audio output can be provided instead of, or in addition to, display output. In another example, if display subsystem 630 includes a touch screen, the display device may also act as an input device, which can be at least partially managed by I/O controller 640. There can also be additional buttons or switches on computing device 600 to provide I/O functions managed by I/O controller 640.

In some embodiments, I/O controller 640 manages devices such as accelerometers, cameras, light sensors or other environmental sensors, or other hardware that can be included in computing device 600. The input can be part of direct user interaction, and may provide environmental input to the system to influence its operations (such as filtering for noise, adjusting displays for brightness detection, applying a flash for a camera, or other features).

Power management component 650 may include hardware components (e.g., power management devices and/or circuitry) and software components (e.g., drivers and/or firmware) associated with managing battery power usage, battery charging, and features related to power saving operation.

Memory subsystem 660 may include one or more memory devices for storing information in computing device 600. Memory subsystem 660 can include nonvolatile memory devices (whose state does not change if power to the memory device is interrupted) and/or volatile memory devices (whose state is indeterminate if power to the memory device is interrupted). Memory subsystem 660 can store application data, user data, music, photos, documents, or other data, as well as system data (whether long-term or temporary) related to the execution of the applications and functions of computing device 600.

Some portion of memory subsystem 660 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 670 may include a network interface, such as a cellular interface 672 or a wireless interface 674 (so that an embodiment of computing device 600 may be incorporated into a wireless device such as a cellular phone or a personal digital assistant). In some embodiments, connectivity component 670 includes hardware devices (e.g., wireless and/or wired connectors and communication hardware) and software components (e.g., drivers and/or protocol stacks) to enable computing device 600 to communicate with external devices. Computing device 600 could include separate devices, such as other computing devices, wireless access points or base stations, as well as peripherals such as headsets, printers, or other devices.

In some embodiments, connectivity component 670 can include multiple different types of network interfaces, such as one or more wireless interfaces for allowing processor 610 to communicate with another device. To generalize, computing device 600 is illustrated with cellular interface 672 and wireless interface 674. Cellular interface 672 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 674 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 680 may include hardware interfaces and connectors, as well as software components (e.g., drivers and/or protocol stacks) to make peripheral connections. It will be understood that computing device 600 could both be a peripheral device to other computing devices (via "to" 682), as well as have peripheral devices connected to it (via "from" 684). The computing device 600 may have a "docking" connector to connect to other computing devices for purposes such as managing content on computing device 600 (e.g., downloading and/or uploading, changing, synchronizing). Additionally, a docking connector can allow computing device 600 to connect to certain peripherals that allow computing device 600 to control content output, for example, to audiovisual or other systems.

In addition to a proprietary docking connector or other proprietary connection hardware, computing device 600 can make peripheral connections 680 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

An example apparatus comprises: a first circuitry comprising a plurality of first ingress ports, a plurality of first egress ports, and a bus, at least two of the first ingress ports and at least two of the first egress ports being coupled to the bus; and a second circuitry comprising a plurality of second ingress ports and a plurality of second egress ports, at least two of the second ingress ports being one-to-many coupled to at least two of the second egress ports, wherein at least one first ingress port is one-to-one coupled to a second egress port, and at least one second ingress port is one-to-one coupled to a first egress port.

In some embodiments, the first circuitry comprises a central arbiter, and at least two of the first ingress ports are one-to-one coupled to the central arbiter by separate request indicators. In some embodiments, at least two of the second egress ports comprise an egress arbiter, and at least two of the second ingress ports are one-to-many coupled to at least two of the egress arbiters by separate request indicators. In some embodiments, at least two of the second ingress ports comprise a multicast controller. In some embodiments, at least two of the multicast controllers are one-to-many coupled to at least two of the second egress ports by separate egress-request indicators. In some embodiments, at least two first ingress ports are one-to-one coupled to second egress ports, and at least two second ingress ports are one-to-one coupled to first egress ports.

An example system comprises a memory, a processor coupled to the memory, and a wireless interface for allowing the processor to communicate with another device, the system including any of the exemplary apparatus described above.

An example apparatus comprises: a shared-bus backbone circuitry comprising a plurality of shared-bus ports, at least two of the shared-bus ports comprising an ingress side, an egress side, an external inbound interface, and an external outbound interface; and a crossbar backbone circuitry comprising a plurality of crossbar ports and one or more multicast controllers, at least two of the crossbar ports comprising an ingress side and an egress side, and at least one of the multicast controllers being coupled to the ingress sides of least two of the crossbar ports, wherein an external outbound interface of at least one crossbar port is one-to-one coupled to an external inbound interface of a shared-bus port, and an external outbound interface of at least one shared-bus port is one-to-one coupled to an external inbound interface of a crossbar port.

In some embodiments, the shared-bus backbone circuitry comprises a central arbiter, and at least two of the shared-bus ports comprise ingress sides that are one-to-one coupled to the central arbiter by separate request indicators. In some embodiments, the crossbar backbone circuitry comprises a plurality of egress arbiters, and the ingress sides of at least two of the crossbar ports are one-to-many coupled to at least two of the egress arbiters by separate request indicators. In some embodiments, at least one of the multicast controllers are one-to-one coupled to the ingress side of at least two of the crossbar ports. In some embodiments, the multicast controllers of at least two of the multicast controllers are one-to-many coupled to the egress sides of at least two of the crossbar ports by separate egress-request indicators.

An example system comprises a memory, a processor coupled to the memory, and a wireless interface for allowing the processor to communicate with another device, the system including any of the exemplary apparatus described above.

An example method comprises: providing one or more design files modeling a datapath comprising a plurality of ports, a first backbone coupling the plurality of ports, and a second backbone coupling the plurality of ports, the one or more design files comprising a configuration parameter for the datapath; and exposing the configuration parameter to accept one of: a first value and a second value, wherein the one or more design files are to be loaded by a design tool; wherein the one or more design files are to instantiate the first backbone when the configuration parameter is set to the first value; and wherein the one or more design files are to instantiate the second backbone when the configuration parameter is set to the second value.

In some embodiments, the first backbone is a shared-bus backbone, and the second backbone is a crossbar backbone. In some embodiments, the design tool exposes the configuration parameter. In some embodiments, a method comprises: setting the configuration parameter to one of a first value and a second value. In some embodiments, a method comprises: compiling the one or more design files with the design tool. In some embodiments, a method comprises: providing one or more design files modeling a circuitry incorporating at least one instance of the datapath. In some embodiments, the circuitry is a Network-on-a-Chip. In some embodiments, a method comprises: manufacturing a silicon component incorporating the datapath. In some embodiments, the design tool is one of: a synthesis tool, or a timing analysis tool. In some embodiments, the one or more design files comprises a Register Transfer Language (RTL) file. In some embodiments, a method comprises: providing one or more design files modeling a circuitry incorporating at least a first instance of the datapath and a second instance of the datapath, wherein a port of the first instance of the datapath is coupled to a port of the second instance of the datapath.

An example machine readable storage medium has machine executable instructions stored thereon that, when executed, cause one or more processors to perform any of the exemplary methods described above.

An example system comprises a memory, a processor coupled to the memory, and a wireless interface for allowing the processor to communicate with another device, and the system comprises: a first circuitry comprising a plurality of first ingress ports, a plurality of first egress ports, and a bus, at least two of the first ingress ports and at least two of the first egress ports being coupled to the bus; and a second circuitry comprising a plurality of second ingress ports and a plurality of second egress ports, at least two of the second ingress ports being one-to-many coupled to at least two of the second egress ports, wherein at least one first ingress port is one-to-one coupled to a second egress port, and at least one second ingress port is one-to-one coupled to a first egress port.

In some embodiments, the first circuitry comprises a central arbiter, and at least two of the first ingress ports are one-to-one coupled to the central arbiter by separate request indicators. In some embodiments, at least two of the second egress ports comprise an egress arbiter, and at least two of the second ingress ports are one-to-many coupled to at least two of the egress arbiters by separate request indicators. In some embodiments, at least two of the second ingress ports comprise a multicast controller. In some embodiments, at least two of the multicast controllers are one-to-many coupled to at least two of the second egress ports by separate egress-request indicators. In some embodiments, at least two first ingress ports are one-to-one coupled to second egress ports, and at least two second ingress ports are one-to-one coupled to first egress ports.

An example machine readable storage medium has machine executable instructions stored thereon that, when executed, cause one or more processors to perform an operation comprising: provide one or more design files modeling a datapath comprising a plurality of ports, a first backbone coupling the plurality of ports, and a second backbone coupling the plurality of ports, the one or more design files comprising a configuration parameter for the datapath; and expose the configuration parameter to accept one of: a first value and a second value, wherein the one or more design files are to be loaded by a design tool; wherein the one or more design files are to instantiate the first backbone when the configuration parameter is set to the first value; and wherein the one or more design files are to instantiate the second backbone when the configuration parameter is set to the second value.

In some embodiments, the first backbone is a shared-bus backbone, and the second backbone is a crossbar backbone. In some embodiments, the design tool exposes the configuration parameter. In some embodiments, the operation comprises: set the configuration parameter to one of a first value and a second value. In some embodiments, the operation comprises: compile the one or more design files with the design tool. In some embodiments, the operation comprises: provide one or more design files modeling a circuitry incorporating at least one instance of the datapath. In some embodiments, the circuitry is a Network-on-a-Chip. In some embodiments, the operation comprises: manufacture a silicon component incorporating the datapath. In some embodiments, the design tool is one of: a synthesis tool, or a timing analysis tool. In some embodiments, the one or more design files comprises a Register Transfer Language (RTL) file. In some embodiments, the operation comprises: provide one or more design files modeling a circuitry incorporating at least a first instance of the datapath and a second instance of the datapath, wherein a port of the first instance of the datapath is coupled to a port of the second instance of the datapath.

An example apparatus comprises: means for providing one or more design files modeling a datapath comprising a plurality of ports, a first backbone coupling the plurality of ports, and a second backbone coupling the plurality of ports, the one or more design files comprising a configuration parameter for the datapath; and means for exposing the configuration parameter to accept one of: a first value and a second value, wherein the one or more design files are to be loaded by a design tool; wherein the one or more design files are to instantiate the first backbone when the configuration parameter is set to the first value; and wherein the one or more design files are to instantiate the second backbone when the configuration parameter is set to the second value.

In some embodiments, the first backbone is a shared-bus backbone, and the second backbone is a crossbar backbone. In some embodiments, the design tool exposes the configuration parameter. In some embodiments, an apparatus comprises: means for setting the configuration parameter to one of a first value and a second value. In some embodiments, an apparatus comprises: means for compiling the one or more design files with the design tool. In some embodiments, an apparatus comprises: means for providing one or more design files modeling a circuitry incorporating at least one instance of the datapath. In some embodiments, the circuitry is a Network-on-a-Chip. In some embodiments, an apparatus comprises: means for manufacturing a silicon component incorporating the datapath. In some embodiments, the design tool is one of: a synthesis tool, or a timing analysis tool. In some embodiments, the one or more design files comprises a Register Transfer Language (RTL) file. In some embodiments, an apparatus comprises: means for providing one or more design files modeling a circuitry incorporating at least a first instance of the datapath and a second instance of the datapath, wherein a port of the first instance of the datapath is coupled to a port of the second instance of the datapath.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a shared-bus backbone circuitry comprising a plurality of shared-bus ports, at least two of the shared-bus ports comprising an ingress side, an egress side, an external inbound interface, and an external outbound interface; and
   a crossbar backbone circuitry comprising a plurality of crossbar ports and one or more multicast controllers, at least two of the crossbar ports comprising an ingress side and an egress side, and at least one of the multicast controllers being coupled to the ingress sides of least two of the crossbar ports,
   wherein an external outbound interface of at least one crossbar port is one-to-one coupled to an external inbound interface of a shared-bus port, and an external outbound interface of at least one shared-bus port is one-to-one coupled to an external inbound interface of a crossbar port.

2. The apparatus of claim 1, wherein the shared-bus backbone circuitry comprises a central arbiter, and at least two of the shared-bus ports comprise ingress sides that are one-to-one coupled to the central arbiter by separate request indicators.

3. The apparatus of claim 1, wherein the crossbar backbone circuitry comprises a plurality of egress arbiters, and wherein the ingress sides of at least two of the crossbar ports are one-to-many coupled to at least two of the egress arbiters by separate request indicators.

4. The apparatus of claim 1, wherein at least one of the multicast controllers are one-to-one coupled to the ingress side of at least two of the crossbar ports.

5. The apparatus of claim 4, wherein the multicast controllers of at least two of the multicast controllers are one-to-many coupled to the egress sides of at least two of the crossbar ports by separate egress-request indicators.

6. A method comprising:
   providing one or more design files modeling a datapath comprising a plurality of ports, a first backbone coupling the plurality of ports, and a second backbone coupling the plurality of ports, the one or more design files comprising a configuration parameter for the datapath; and
   exposing the configuration parameter to accept one of: a first value and a second value,
   wherein the one or more design files are to be loaded by a design tool;
   wherein the one or more design files are to instantiate the first backbone when the configuration parameter is set to the first value; and
   wherein the one or more design files are to instantiate the second backbone when the configuration parameter is set to the second value.

7. The method of claim 6, wherein the first backbone is a shared-bus backbone, and the second backbone is a crossbar backbone.

8. The method of claim 6, wherein the design tool exposes the configuration parameter.

9. The method of claim 6, comprising:
   setting the configuration parameter to one of a first value and a second value.

10. The method of claim 6, comprising:
    compiling the one or more design files with the design tool.

11. The method of claim 6, comprising:
    providing one or more design files modeling a circuitry incorporating at least one instance of the datapath.

12. The method of claim 11, wherein the circuitry is a Network-on-a-Chip.

13. The method of claim 6, comprising:
    manufacturing a silicon component incorporating the datapath.

14. The method of claim 6, wherein the design tool is one of: a synthesis tool, or a timing analysis tool.

15. A system comprising a memory, a processor coupled to the memory, and a wireless interface for allowing the processor to communicate with another device, the system comprising:
    a first circuitry comprising a plurality of first ingress ports, a plurality of first egress ports, and a bus, at least two of the first ingress ports and at least two of the first egress ports being coupled to the bus; and
    a second circuitry comprising a plurality of second ingress ports and a plurality of second egress ports, at least two of the second ingress ports being one-to-many coupled to at least two of the second egress ports,
    wherein at least one first ingress port is one-to-one coupled to a second egress port, and at least one second ingress port is one-to-one coupled to a first egress port.

16. The system of claim 15, wherein the first circuitry comprises a central arbiter, and wherein at least two of the first ingress ports are one-to-one coupled to the central arbiter by separate request indicators.

17. The system of claim 15, wherein at least two of the second egress ports comprise an egress arbiter, and wherein at least two of the second ingress ports are one-to-many coupled to at least two of the egress arbiters by separate request indicators.

18. The system of claim 15, wherein at least two of the second ingress ports comprise a multicast controller.

19. The system of claim 18, wherein at least two of the multicast controllers are one-to-many coupled to at least two of the second egress ports by separate egress-request indicators.

20. The system of claim 19, wherein at least two first ingress ports are one-to-one coupled to second egress ports, and at least two second ingress ports are one-to-one coupled to first egress ports.

* * * * *